(No Model.)
E. S. SIMMONS.
BEAN HARVESTER.
No. 280,966. Patented July 10, 1883.
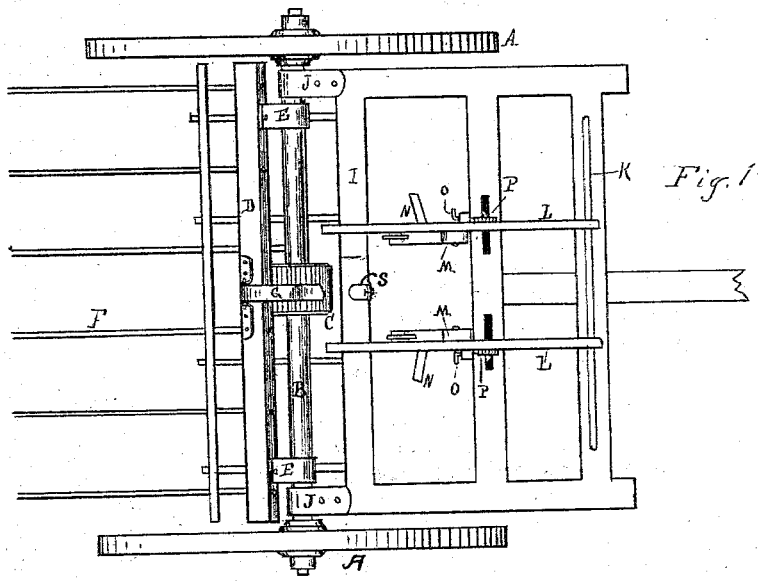
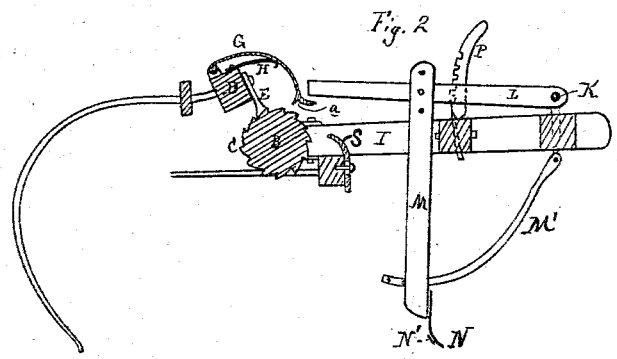
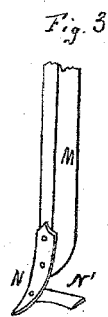
Inventor:
Edmond S. Simmons
By Thos. S. Sprague
Att'y
Attest:

UNITED STATES PATENT OFFICE.

EDMOND S. SIMMONS, OF FOWLERVILLE, MICHIGAN, ASSIGNOR OF ONE-HALF TO GEORGE A. LEONARD, OF SAME PLACE.

BEAN-HARVESTER.

SPECIFICATION forming part of Letters Patent No 280,966, dated July 10, 1883.

Application filed December 8, 1882. (No model.)

*To all whom it may concern:*

Be it known that I, EDMOND S. SIMMONS, of Fowlerville, in the county of Livingston and State of Michigan, have invented new and useful Improvements in Bean-Harvesters; and I hereby declare that the following is a full, clear, and exact description thereof, reference being had to the accompanying drawings, which form a part of this specification.
This invention relates to certain new and useful improvements in the construction of bean-harvesters, by means of which roots are cut off below the surface and loosened, so that they may be readily gathered by the following rake.

The invention consists in the peculiar construction, operation, and combination of the parts, all as more fully hereinafter set forth, and particularly pointed out in the claims.
Figure 1 is a plan view. Fig. 2 is a vertical central section. Fig. 3 is a perspective of one of the cutters detached.

In the accompanying drawings, A represents suitable traction-wheels, which are mounted upon the axle or shaft B.

C is a broad-faced ratchet-wheel rigidly secured upon the axle B, at or near its longitudinal center.

D represents a rake-frame, which is pivotally secured upon the axle by the band-clips E, as shown, such rake-frame carrying the rake-teeth F.

G represents a dog-bar, one end of which is pivotally secured to the rake-frame, while the opposite end is provided with the hook a, which is designed to engage with the ratchet-wheel C at the option of the operator. This dog-bar rests upon the spring H, one end of which is rigidly secured to the rake-head.
I represents a suitable frame, which is pivotally secured and mounted upon the axle B by means of the strap-clips J, and to the front girt of this frame is rigidly secured the upwardly-projecting bail or bar K, upon which are properly secured the bars L, to which the upper ends of the bars M are secured. The lower end of each of said bars M is provided with a shovel, N, having a little above its point a horizontal cutter, N'. The cutter and shovel on the lower end of each bar M are held against backward strains by an arm, M', extending down from the forward end of the frame I, as shown by Fig. 2. Each of the bars L is provided with a spring-bolt, O, which is designed to engage with the rack-standard P, rising from the frame I, in order that the cutter may be adjusted vertically, as the circumstances of the work to be performed may require. The lower ends of these rack-standards are adjustably secured to the girt of the frame which supports them, in order that the supporting-bars L and the cutters may be adjusted laterally to operate on the beans in rows nearer or farther apart, as the case may be, it being designed to operate upon two rows at the same time. The narrow cultivator-tooth or shovel N is provided with the outwardly-projecting steel cutter N', the point of which inclines slightly to the rear, so that as the cultivator portion passes along the side of the row the horizontal knife passes and cuts through the roots, which loosens the bean stalks and vines, which, in the forward travel of the machine, are then gathered by the rake at the rear. When the operator desires to dump the rake, he depresses the dog G until its hook engages with the ratchet-wheel C upon the axle. In the still further progress of the machine the rotation of the axle causes the rake to rise and drop its contents upon the ground, when the free end of the dog, in the further rotation of the axle, comes into contact with the detent S, which disengages it from the ratchet and allows the rake to fall back into its original position. This detent is vertically adjustable upon the frame, so as to disengage the dog from the ratchet-wheel at whatever distance from the ground it may be desired to trip the rake.

It is evident that the cutters, with their necessary connections, can readily be secured to the frame of the ordinary sulky hay-rake, and perform the work quite as well as though the machine were especially built for that purpose. I make no claim in this application to the peculiar construction of the rake-operating device, as it may form the subject of a separate application.

What I claim as my invention is—

1. In a bean-harvester, the combination of the rod K, bars L M, arm M', horizontal cutter N', rack-standard P, and spring O, all constructed, arranged, and operating substantially as described.

2. In a bean-harvester, the combination of the rack-standards P, having lateral adjustments, substantially as described, with the rod K, arms L, M, and M', shovel N, and horizontal cutter N', as set forth.

EDMOND S. SIMMONS.

Witnesses:
H. S. SPRAGUE,
E. J. SCULLY.